United States Patent Office 2,961,418
Patented Nov. 22, 1960

2,961,418

CELLULAR POLYESTERURETHANE PRODUCT AND PREPARATION OF SAME

Christoper L. Wilson, Sloatsburg, and Oscar Shuffman, Yonkers, N.Y., assignors to Hudson Foam Plastics Corporation, a corporation of New York No Drawing. Filed Apr. 2, 1954, Ser. No. 420,744

12 Claims. (Cl. 260—2.5)

This invention relates to improved expanded resinous materials and, more particularly, to foamed or expanded materials made from polyester resins.

Polyester resins are made by esterifying polycarboxylic acids with polyhydric alcohols. These resins have gone into widespread use as coating materials, molded products and adhesives. It has also been known that polyester resins can be reacted with polyisocyanates or polyisothiocyanates to produce materials having pronounced flexibility.

It has now been found that certain polyester resins can be reacted with certain di-isocyanates in the presence of certain catalysts to produce greatly improved resilient, expanded or foamed products generally similar to foam rubber but having desirable properties not possessed by foam rubber.

One object of the present invention is to provide improved resilient, expanded materials.

Another object of the invention is to provide novel and improved materials made from polyester resins.

Another object of the invention is to provide an improved process of making light weight, resilient, expanded materials from polyester resins.

Another object of the invention is to provide light weight, resilient, expanded materials having improved sound insulation properties.

Another object of the invention is to provide light weight, resilient, expanded materials having improved resistance to heat.

Another object of the invention is to provide light weight, resilient, expanded materials having improved sound insulation properties.

Another object of the invention is to provide light weight, resilient expanded materials having improved cushioning properties.

Another object of the invention is to provide foamed cushioning materials having improved resistance to burning.

Another object of the invention is to provide foamed resinous materials having improved toughness and tensile strength.

The invention will now be described in more detail.

A principal feature of the present invention is the preparation of an improved light weight, resilient, foamed or expanded material by reacting a polyester resin made from a dibasic acid, such as succinic, adipic or azelaic acid, having more than one carbon atom between the carboxyl groups, and a glycol selected from the class consisting of di-, tri-, and polyethylene glycols, said di-, tri-, and polyethylene glycols being referred to elsewhere herein by the single term "polyethylene glycol", with a di-isocyanate, such as toluene di-isocyanate, in the presence of a catalyst in the form of a tertiary organic amine. The number and size of the pores may be controlled by including various amounts of material, such as water, which reacts with isocyanates liberating gases, and also by utilizing foam stabilizers in the reaction.

Examples of manufacture of improved materials falling within the scope of the present invention will now be given.

*Example 1*

The manufacture of polyester resins of many different types is well known. Satisfactory materials for use in the present invention may be made by esterifying a dibasic acid with a glycol by heating with, if desired, an added acidic catalyst or by cross-esterification of a dialkyl ester of a dibasic acid with a glycol in the presence, if necessary, of a catalyst. The last traces of water or alcohol in the resin are then removed by some convenient method such as vacuum treatment at elevated temperatures.

30 g. of a resin, comprising adipic acid condensed with diethylene glycol and having an acid number of 1 and a hydroxyl number of 42, and being in the form of a thick syrupy liquid, are mixed with 7.5 cc. (9.15 g.) of toluene di-iscoyanate-2, 4, and 0.05 cc. triethylamine, 0.5 cc. water and 0.5 cc. diethylamine oleate as a foam stabilizing agent.

The entire mixture is placed quickly in a mold and the reaction is permitted to proceed. The mixture foams due to liberation of carbon dioxide gas and the material expands to many times its original volume. The reaction is nearly complete in about 2 hours but is allowed to continue for about 24 hours to enable the product to set to a completely non-tacky and light, soft, resilient material.

Although the product resembles foam rubber, it has certain desirable properties not possessed by foam rubber. Material made by the process of Example 1 contains both discrete and connected cells. It is soft and resilient but does not recover its shape quite as rapidly as foam rubber when deformed by pressure. It is therefore better suited for damping of shock and its sound deadening and heat insulating properties are also generally superior to foam rubber in these applications. It also resists temperatures considerably higher than foam rubber without sustaining permanent damage. It melts but does not readily ignite when seared with an open flame.

The various physical properties of the product made as described in the above example, for example, resilience, toughness, softness, size of pores, etc., can be varied by varying the relative proportions of the ingredients and by making certain substitutions in the ingredients, themselves. These are discussed in more detail later.

Polyester resins which have been found suitable for use in the present invention are those made by reacting a polyethylene glycol with a dibasic acid containing more than one carbon atom between the carboxyl groups. The polyester resin may have an acid number up to about 20 and a hydroxyl number between about 20 and 100 and still give a satisfactory product. Di-isocyanates which have been found preferable to use in the reaction are toluene di-isocyanate-2,4 or 2,6 or mixtures of the two. These are the cheapest commercially available di-isocyanates at the present time. Technical grade toluene di-isocyanate has been found especially suitable. The density and texture of the product may be varied, however, by using small additional amounts of other isocyanates and di-isocyanates. The polyester resin and the di-isocyanate can be used in the proportions of about 30 g. resin to 5 to 9 cc. of di-isocyanate. The weight of this ingredient which should be mixed with 30 g. of resin is about 6 to 11 g. The grams of toluene di-isocyanate required for stoichiometric reaction with 30 grams of polyester having a given acid and hydroxyl number is the value of the expression (acid number plus hydroxyl number)×0.0466

As applied to Example 1 above wherein the polyester has an acid number of 1 and a hydroxyl number of 42, the amount of toluene di-isocyanate required for stoichiometric reaction with 30 grams thereof was $$(1+42) \times 0.0466 = 2 \text{ gms.}$$

The amount of toluene di-isocyanate actually used according to Example 1 was 9.15 gms., which is 4.57 times the amount required for stoichiometric reaction with the polyester. The number of times by which the amount of toluene di-isocyanate employed exceeds the amount required for stoichiometric reaction with the polyester in question likewise is given in connection with the remaining examples which designate the acid number and hydroxyl number of the polyester.

Catalysts which can be used in the foaming reaction are tertiary amines of which a number of typical examples are: pyridine, collidine, lutidine, methyl morpholine, triethylamine and $\beta$-diethylaminoethyl acetate. There may also be used salts of these amines with long chain fatty acids, for example, oleic and ricinoleic acids, as well as esters other than acetates of hydroxyamines, such as $\beta$-diethylaminoethanol. Reaction products of these hydroxy-tertiary-amines with isocyanates may also be employed. These are commonly known as urethanes. The speed of the reaction between resin and di-isocyanate depends upon the strength and the amount of the base which is selected. Thus, by choosing bases of different strengths, the reaction speed may be varied as desired. The amount of catalyst which is required varies so greatly with the particular catalyst, as well as with the other components used, that no general rule as to specific amounts can be given. In general, sufficient catalyst should be used to cause the reaction to be about 80% or more complete in 2 hours and substantially complete in about 24 hours. It is believed, however, that the reaction continues very slowly for some time even after the product is complete and ready for use. It is sufficiently complete for all practical purposes, however, after about 24 hours, if performed according to the examples.

The amount of water, or other ingredient reacting with isocyanates to liberate a gas, is that which is required to liberate enough gas to produce foam of desired density. When water is used, the gas liberated is carbon dioxide. The larger the amount of water used, the lower the density of the foam produced. The water reacts with the diisocyanate to produce a stoichiometrical amount of carbon dioxide gas (i.e., 18 g. of water, 1 gm. mol. wt., reacts with an excess of di-isocyanate to produce 44 g. or 22.4 liters, also 1 gm. mol. wt., of carbon dioxide).

The foam stabilizer can be omitted entirely. The amount used depends upon the degree of coarseness (size of bubbles) desired in the product. The maximum useful amount which has been found desirable is about 5% by weight of the entire composition. Higher proportions do not produce any important improvement. The size of the bubbles can also be varied by the use of different foam stabilizers. Examples of foam stabilizers which have been found particularly effective are: mixtures of diethylamine, triethylamine, $$C_6H_5NHCO_2CH_2CH_2N(CH_2CH_3)_2$$

or $$CH_3C_6H_3[NHCO_2CH_2CH_2N(CH_2CH_3)_2]_2$$

with a long chain fatty acid such as oleic acid or ricinoleic acid. Non-ionic wetting agents such as $$CH_3(CH_2)_7C_6H_4O(CH_2CH_2O)_{15}H$$

(Igepal CA-630), or inorganic salts of ricinoleic acid which disperse in the reaction mixture may also be used. Where the foam stabilizer is a tertiary amine compound it may serve both as stabilizer and catalyst in the reaction depending on the relative amounts of amine and fatty acid.

*Example 2*

30 g. of a polyester resin made from adipic acid and diethylene glycol and having an acid number of 20 and hydroxyl number of 28, 7.6 cc. of technical toluene di-isocyanate, which is 4.1 times the amount required for stoichiometric reaction with the polyester, 0.52 cc. water, and 0.6 cc. triethylamine oleate are mixed together rapidly for 30 seconds, placed in a mold and allowed to expand. The foamed product is dry enough to use in about 24 hours.

*Example 3*

30 g. of a polyester resin made by reacting adipic acid and diethylene glycol and having an acid number of 18.5 and hydroxyl number of 20, 7.6 cc. of technical toluene di-isocyanate, which is 5.17 times the amount required for stoichiometric reaction with the polyester, 0.52 cc. water and 0.9 cc. of oleate of $$CH_3C_6H_3[NHCO_2CH_2CH_2N(CH_2CH_3)_2]_2$$

are mixed and allowed to expand to form a foamed product as in the previous examples.

*Example 4*

30 g. of a polyester resin made by reacting adipic acid and diethylene glycol and having an acid number of 18.5 and hydroxyl number of 20, 7.5 cc. of a commercially available toluene di-isocyanate comprising a mixture of the -2,4 and the -2,6 varieties, which is 5.1 times the amount required for stoichiometric reaction with the polyester, 0.5 cc. water, 0.5 cc. triethylamine and 0.05 cc. Igepal CA-630 are mixed and allowed to expand in a mold as in the previous examples. A low density, expanded, resilient product is formed.

*Example 5*

A polyester resin made from adipic acid and diethylene glycol and having a hydroxyl number of 28 and an acid number of 20 (100 g.), technical toluene di-isocyanate (27.5 cc., which is 4.4 times the amount required for stoichiometric reaction with the polyester), benzidine red dye pigment (0.25 g.), methylmorpholine (2.8 cc.), diethylamine ricinoleate (1.86 cc.) and water (1.86 cc.) are mixed mechanically and poured rapidly into a mold. The mass foams up to many times its bulk and sets to a soft, resilient pink foam.

*Example 6*

A polyester resin made from succinic anhydride and polyethylene glycol 400 having a hydroxyl number of 26 and an acid number of 20 (30 g.), toluene di-isocyanate (technical, 7.5 cc., which is 4.3 times the amount required for stoichiometric reaction with the polyester), water (0.52 cc.), sodium ricinoleate solution (50%, 0.5 cc.) and collidine (0.6 cc), are mixed rapidly by mechanical means. The product foams rapidly and overnight produces a white resilient product.

*Example 7*

A polyester resin made from azelaic acid and diethylene glycol and having a hydroxyl number of 44 and an acid number of 16 (30 g.), technical toluene di-isocyanate (7.5 cc., which is 3.28 times the amount required for stoichiometric reaction with the polyester), diethylamine oleate (0.5 cc.), sodium ricinoleate (50%, 0.5 cc.), 2-cyanoethyl 2-diethylaminoethyl ether (0.5 cc.) and water (0.52 cc.) are mixed rapidly and allowed to expand.

*Example 8*

A polyester resin made from adipic acid and diethylene glycol (30 g.), technical toluene di-isocyanate (7.5 cc.), 2-morpholinylethyl phenyl carbonate (1.05 cc.) and a water suspension of dispersed phthalocyanine blue pigment (12%, 0.6 cc.) are rapidly mixed and allowed to react to give a blue foam.

Example 9

A polyester resin made from dimethyl adipate and diethylene glycol in the presence of a lead oxide catalyst and having a hydroxyl number of 41 and an acid number of 1.5 (30 g.), 2-(2-morpholinylethyl)-tetrahydropyran (1.0 cc.), aqueous potassium ricinoleate (50%, 1.0 cc.) are rapidly mixed with commercial toluene di-isocyanate (7.5 cc., which is 4.62 times the amount required for stoichiometric reaction with the polyester) and allowed to expand.

Referring to the foregoing examples, the amount of toluene di-isocyanate used ranged from 3.28 (Example 7) to 5.17 (Example 3) times the amount required for stoichiometric reaction with the polyester employed.

Foamed products made as above described have a density of about 0.15 to about 0.025 g./cc. depending upon the particular ingredients chosen and their proportions. The products are generally soft and resilient and superior to foam rubber in cushioning properties and durability. They have many uses such as in upholstery, mattresses, pillows, sound insulating materials and many other applications where shock absorbing materials are required. They also have many special uses such as oil-resistant filters and filters for such widely varied materials as air, blood and milk.

If the reaction mixture used to make the foamed product is squirted or otherwise introduced into either a closed or open mold of any desired shape, it can be used to make light weight, resilient products such as toys, containers, life preservers, pontoons, buoys and the like. The surface of the mold is coated with a mold lubricant, such as zinc stearate or wax, and the mold is merely given a charge of the reaction mixture. External heat is not usually necessary. The molded product has a sealed surface permiting it to be used in articles without further treatment or covering.

Although the products of the present invention are more resistant to heat and to burning than many other similar products, they can be given increased fireproof properties by addition of chlorine or phosphorus containing materials. Organic chloro-compounds can be used, for example, chlorendic acid. The reaction mix may contain up to about 5% by weight of the chlorinated compound. Instead of a simple chlorinated compound, up to about 5% by weight of a phosphate such as tricresyl phosphate or tris chlorethylphosphite can be used instead in the foam-producing mixture.

With no extra coloring matter added, the foamed products of the invention have a natural creamy, almost white, color suitable for most commercial applications. If colored products are desired, however, the color can be incorporated in any one of several ways. For example, as described in some of the examples, finely divided pigments, either organic or inorganic, can be incorporated into the mix when it is prepared, just prior to the molding operation. The material can also be dyed after the molding operation is complete by treating it at the desired temperature in a solution of almost any of the dyes commonly used to dye synthetic fibers such as cellulose acetate or Dacron. Unlike other foamed resilient materials, the materials of the present invention are sufficiently tough and firm to be stitched to woven cloth or other sheet materials. Thus it is possible to use these materials in interliners, upholstery padding and many other similar applications.

We claim:

1. A method of making an expanded, resilient, cellular material having discrete and connected cells comprising reacting a viscous liquid polyester resin which is the reaction product of a polyethylene glycol and an organic dicarboxylic acid containing more than one carbon atom between the carboxyl groups, with toluene diisocyanate and water in the presence of a tertiary amine catalyst, said polyester resin having an acid number of about 1–20 and a hydroxyl number of about 20–100, the amount by weight of said diisocyanate ranging from approximately 3.28 to approximately 5.17 times the amount required for stoichiometric reaction with said polyester resin and the amount of water being sufficient to react with the said toluene diisocyanate that is in exces of that stoichiometrically reactive with said polyester to produce carbon dioxide gas for providing a lightweight foam.

2. A lightweight, cellular, resilient, resinous product made by the method of claim 1.

3. A method of making an expanded, resilient, cellular material having discrete and connected cells comprising reacting a viscous liquid polyester resin which is the reaction product of a polyethylene glycol and a dibasic acid selected from the group consisting of succinic, adipic and azelaic acids, with toluene diisocyanate and water in the presence of a tertiary amine catalyst, said polyester resin having an acid number of about 1–20 and a hydroxyl number of about 20 to 100, the amount by weight of said di-isocyanate ranging from approximately 3.28 to approximately 5.17 times the amount required for stoichiometric reaction with said polyester resin and the water being sufficient in amount to react with the said toluene di-isocyanate that is in excess of that stoichiometrically reactive with said polyester to produce carbon dioxide gas for providing a lightweight foam.

4. A method according to claim 3 wherein said polyester resin, said toluene diisocyanate, said water and said tertiary amine are mixed simultaneously.

5. The method of claim 3 wherein said tertiary amine catalyst is an alkyl tertiary amine catalyst and further including a foam stabilizing agent in said reaction mixture.

6. A lightweight, cellular, resilient, resinous product made by the method of claim 3.

7. A method according to claim 3 in which said dibasic acid is azelaic acid and said polyethylene glycol is diethylene glycol.

8. A method according to claim 3 in which said dibasic acid is adipic acid and said polythylene glycol is diethylene glycol.

9. A lightweight, cellular, resilient, resinous product made by the method of claim 8.

10. The method of claim 5 and further including chlorendic acid amounting to about 5% by weight of said reaction mixture.

11. A method according to claim 5 in which said dibasic acid is adipic acid and said polyethylene glycol is diethylene glycol.

12. A method according to claim 5 in which said dibasic acid is azelaic acid and said polyethylene glycol is diethylene glycol.

References Cited in the file of this patent

UNITED STATES PATENTS

| | | |
|---|---|---|
| 2,577,280 | Simon et al. | Dec. 4, 1951 |
| 2,577,281 | Simon et al. | Dec. 4, 1951 |
| 2,602,783 | Simon et al. | July 8, 1952 |
| 2,650,212 | Windemuth | Aug. 25, 1953 |

FOREIGN PATENTS

| | | |
|---|---|---|
| 516,512 | Belgium | Jan. 15, 1953 |

OTHER REFERENCES

Hooker Electrochemical Bulletin No. 40, "Het Acid," page 1, copyright 1952.